United States Patent Office 3,428,551
Patented Feb. 18, 1969

3,428,551
PROCESS OF PREPARING A FILTER MEDIUM FROM MOSS AND ITS USE
John Ernest Dawe, Crowell Post Office, Shelburne County, Nova Scotia, Canada
No Drawing. Filed Oct. 29, 1964, Ser. No. 407,520
U.S. Cl. 208—188   6 Claims
Int. Cl. C10g 33/04

ABSTRACT OF THE DISCLOSURE

Residues of moss plants (Sphagnum and Hypnum genus) growing on a bog are collected from a shallow near-surface layer, the selected material being nearly free of peat and under microscopic examination revealing undegraded cellular and channel network structures. Foreign matter is removed and the residues are washed to remove colloidal contaminants, then are soaked at an elevated temperature, e.g. from 120° F. to nearly boiling point in an aqueous dilute NaOCl solution at a concentration from 0.05% to 10%, until decolored and waxes and sizing compounds are released; a series of baths of decreasing concentration is very effective. The decolored material is rinsed to neutrality and dried to a moisture content from 10% to 45% to yield a stable, resilient product. By the use of filters packed with the product, clarification of stable water-in-oil emulsions in hydrocarbons is shown to be excellent; superior filtering of fruit juices and green beer is shown; and effective oil filters at engine operating temperatures are realized.

---

This invention relates to a method of cleaning and decolorising peat moss and to the improved adsorbent product resulting from the treatment which is highly effective as a filtering medium for fluids and gases.

The raw material for the method and product of my invention comprises naturally occurring peat moss residues, particularly the residual structural parts of plants of the order Sphagnaceae, and of the genus Sphagnum or Hypnum, commonly found growing on the surfaces of bogs in the temperate zones of the world. These mosses are the principal contributors to the peat deposits which occur, often having a considerable depth. The accumulation of plant remains in the deeper layers is a highly humidified mass in which the fibrous structure is materially degraded and which consists mainly of humus, a term denoting semi-solid water-saturated colloidal masses forming an organic "mud" whose ash content may range from 10 to 20 percent. Such highly humidified material, commonly known as peat, is entirely unsuitable as a starting material.

The top layers of a bog, on the other hand, comprise relatively recent plant remains whose cellular structure is nearly intact, so that its absorptive capacity is not significantly impaired. The highest grade of raw material is taken from the upper two or three inches of the deposit, depending on the variation of water levels and other factors. Such material on close inspection shows almost no peaty matter, has a moderate to dark brown color, and has structural integrity as evidenced by its well preserved finely branched form and by coherence under handling. Sections examined under a magnification of about 100× reveal the cellular character and intricate network of capillary channels along the fibres which make the moss a potentially effective adsorber.

Such plant remains, even when carefully washed, possess several defects that render the material unsuitable as a filtering or coalescing medium. The material releases an objectionable yellow-brown stain when wetted with water, hydrocarbon, or other organic solvents, making it useless for treatment of any food material or for industrial clarifying processes. The presence of natural waxes such as montan or ozokerite waxes, as well as natural sizing compounds and other hydrophobic matter, restricts the capacity of the moss to absorb fluids and to coalesce fine emulsions of the water-in-oil type or protein "hazes." The raw moss continually releases adhered colloidal materials not removed by washing, for a protracted period after initial cleaning, and often possesses a disagreeable odour. The moistened material will usually be slightly acidic. The raw moss tends to be unstable, especially on long exposure to hydrocarbon fluids at room temperature or higher.

I have found that the foregoing disadvantages may be overcome and a high quality, high adsorbency odorless filter medium prepared economically from raw cleaned peat moss deposits, by a simple leaching with an aqueous oxygen-liberating solution at a pH above 8.5, preferably in the range pH 9.0 to about pH 12, and also preferably at a temperature in the range from about 100° to about 205° F., followed by rinsing to neutral pH and gentle drying to a predetermined moisture content.

The process by which the improved adsorbing and coalescing properties are imparted to the material comprises the steps of initially dressing the moss deposits harvested from a bog to separate foreign matter such as leaves, sticks, and degraded peat-like portions, washing out the colloidal and fine suspended muds, then immersing the pre-cleaned moss fragments in an aqueous alkali bleach solution at an elevated temperature but not so high as to produce significant ebullition and for a time sufficient to attain the desired grade of adsorbency and freedom from color in the ultimate product, followed by washing to neutrality, drying, grinding and screening.

I prefer to use as bleach solution, any alkali hypochlorite capable of liberating active oxygen in hot aqueous medium, and have found sodium hypochloride to be particularly suitable for the purpose. The concentration may range from about 0.05% to about 10.0% by weight, the pH range of such solutions ranging from about 8.5 to about 12.

The period of treatment may be adjusted according to the concentration and temperature to a period of from 10 to 90 minutes. The best results are obtained when the bleach solution has a low concentration of hypochlorite, with a pH in the range from about 9.5 to 11, and the temperature is in the range from about 150° to about 205° F.

The adsorption characteristics and toughness of the material resulting from the treatment, following its rinsing and dewatering, are significantly improved when the product is gently dried without baking to a retained moisture content of from about 30% to about 40% based on dry moss weight. The dried moss should not have less than about 10% nor more than about 45% moisture content, to avoid undue crumbling in handling, and to prevent further humidification on long term storage.

The treatment of moss plant remains which are harvested in an initially coherent structural condition according to the novel method produces a light-coloured product which retains almost all of its original strength and coherence. The stiffness of the material, i.e. its ability to withstand compression and packing down, is actually improved by the alkaline bleach treatment. The undesired waxes, colloids, coloring materials, and organic acid contaminants are substantially freed by the leaching process, allowing these constituents to be washed away in the rinsing step. The resultant product is an open, stable, sterile, freely absorbent particulate material having excellent coalescing properties for water emulsions and suspended matter, and being useful for a wide range of applications in filtering liquids, vapours and gases, and being particularly effective as a cigarette filter material.

The following examples are given to illustrate the practice of the invention and to provide specific direction for choosing particular process parameters in accordance with the desired end use for the product.

EXAMPLE 1

A 200-gram sample of air-dried bog moss remains selected from the upper five inch layer of a peat bog in Nova Scotia was initially screened to remove debris and aircleaned to remove dust and fine particles. The sample was washed repeatedly with large volumes of warm water over a period of two hours. A test portion was lightly pressed between blotters to remove surface wetness and was oven dried; by weight difference the initial water content was calculated to have been 84%. The sample was air-dried to an indicated moisture content of 35%, and was divided into two portions. One portion was arranged as a bed in a gravity filter column of 2 inch diameter, through which a green beer was filtered. The stock was distinctly cloudy in appearance. In a single pass, the effluent stock was seen to have become quite clear, but noticeably stained, and carried an alien flavour.

The second portion was similarly arranged in a gravity filter column and received a petroleum distillate containing considerable moisture and haze, the material falling within the ASTM specification for a light FBP middle distillate of 670–700 degree F. flash point. The haze was known to be a very fine water emulsion stabilized with naturally occurring acid oils. One pass of the distillate through the column showed significant improvement in clarity, but the product was strongly dyed a tea color by coloring matter leached from the raw moss.

EXAMPLE 2

Several pecks of peat moss comprising a mixture of plant remains identified as Spagnum and Hypnum mosses taken from the upper four inches of a peat bog was air dried, hand picked to remove debris, and screened to remove fines. The sample was then washed in water at 70° F., and transferred by a sieve while wet to a first leaching vat containing sodium hypochlorite in warm water at a concentration of 0.10% by weight. Electrical heating elements of the immersion type held the temperature at 175° F. After 15 minutes the moss fragments were gathered by a fine mesh sieve and strained out of the liquor, then placed in a second leaching vat held at 160° F. and containing fresh sodium hypochlorite in water at a concentration of about 0.05% by weight. The leaching in the second vat was terminated after 15 minutes when the pH of the solution was about 9.2 and the moss was removed and pressed to expel excess liquid. The treated moss product was dispersed as a stock in a large volume of warm rinse water from which it was removed when tests showed it to be substantially neutral. The sample was drained and spread out on trays and air dried slowly with turning until the indicated moisture content was 30%. It had a very light to pale straw colour, and was odorless and tasteless, having a very soft feel to the hand. The sample was divided into two equal portions.

A gravity filter column was formed with a first sample portion, and the petroleum distillate of Example 1 was introduced into the top end of the column at a temperature between 60 and 70 degrees F. The effluent was found to be crystal clear and to be substantially colorless as compared with the input material.

A pilot plant scale deep bed filter was packed with the second sample portion and was kept in operation on a heavy gas oil stream for a period of 336 hours, with no noticeable breakdown or degradation of the filter medium, maintaining an excellent emulsion-coalescing action and providing a clear throughput.

A pilot plant filter of the same type was packed with fiber glass and was found to require a much greater weight of filter medium than the weight of moss used. The same type of middle distillate as was used in Example 1 was passed through the fiber glass bed. Even during the first few minutes of operation the effluent was not haze free and after a short period of operation the bed had ceased to noticeably improve the distillate passing through it.

The glass fiber was discarded and the same filter was repacked with excelsior made of white pine, requiring at least four times the weight of material as the moss bed. When the middle distillate was passed through the excelsior bed for the first hour of operation the haze was diminished but at no time was it capable of giving a haze-free output. After three hours of throughput the bed had ceased to have any effect on the clarity of the gas oil stream.

The tests indicated that this grade of prepared moss is effective when used as a coalescing filter medium for clarifying hazed hydrocarbons. It would be equally effective when used for clarifying stabilised emulsions of protein colloids in food liquids such as crude cane syrups, apple juice, and generally in extractive processes.

EXAMPLE 3

A raw peat moss which contained considerably more peat than was found in the starting material of Example 2, was gathered and precleaned. It was then bleached by a three stage treatment with hot sodium hypochlorite solution. The first stage of the treatment employed a 2% by weight solution at 205° F., and was followed by the second and third stages in which the leaching baths were at the same temperature and had concentrations respectively of 0.10% and 0.5% by weight, each stage lasting 30 minutes. The product was then washed to neutrality, dewatered, and oven dried in currents of air to a final moisture content of 20%. The resulting product was slightly darker than that of Example 2 and appeared to be slightly coarser and more brittle. It was also tasteless and odorless. The tests that were conducted for Example 2 were repeated, with similar results. A further test was made with a jet fuel at 65° F., showing that a single pass through a two-inch depth of packed treated moss completely clarified the fuel of water emulsions and suspended iron pigment, without liberating any discernible color from the moss.

EXAMPLE 4

A sample of cleaned, bleached peat moss prepared as for Example 2, was employed as filter medium in a gravity filter column, through which green bear was passed to determine the effectiveness of the medium with a difficut-to-remove haze. It was found that the effluent was completely clear, and had picked up no color or odour from the peat moss.

The test indicates that in its ability to act as a coalescer for emulsified contaminants, in beverages and foods, treated peat moss ranks well above many other filter media, and in particular is superior to finely divided porous mineral matter often used for the purpose, such as silica sand. Moreover a smaller weight and volume of moss filter removes objectionable emulsions of the water-in-oil type or of the albumen or protein type in water than does excelsior or glass filament felt.

EXAMPLE 5

A three-bushel sample of cleaned, bleached peat moss was prepared as for Example 3, in three baths, using as starting material a moderately humidified material containing about 40% peaty matter by volume. The concentrations of the baths were, respectively, 2.33%, 1.33%, and 0.05% by weight of sodium hypochlorite. Each bath was 25 minutes long and the temperature was maintained at above 200° F. with incipient ebullition. The bleached product taken from the last bath was washed repeatedly at 125° F. in water, then drained and air dried, followed by oven drying at 165° F. in currents of air until the moisture content of the product was reduced to between 12–15%. The plant structure was found to be relatively intact, and the product had a light sand colour. There was no evidence of any odor or taste, and microscopic inspection showed a cellular structure much the same as that found in Example 2. It was considered that the material would be equally effective as a filtering and coalescing medium.

EXAMPLE 6

A bleached peat moss product was prepared as in Example 2, and was air-dried in warm currents to an indicated moisture content of 18%. A single stage radial flow oil filter was packed with relatively coarse moss fragments, and the filter was connected to pass a continuous low-pressure flow of hot crankcase oil of non-detergent type from an industrial diesel engine, the input oil being at a temperature in the range 205° to 238° F.

Periodic checks of the sump oil were made to check adequacy of filtering, maintenance of lubricity, and to measure build-up of acidity. During the period of the test, 200 hours, the oil retained its original body, oiliness, clarity and color, and no build-up of acidity was detected. Inspection of the moss structure on dismantling the filter showed that very slight degradation of the outer zone had developed. However the state of the major part of the material at the end of the test strongly suggested that oil filters using the treated moss would be capable of withstanding even higher temperatures.

EXAMPLE 7

Peat moss was prepared and treated as in Example 2, and the product was reduced by grinding in an impact mill to an average particle size passing a 16 mesh screen. Fines passing a 32 mesh screen were removed by air suction and the substantially uniformly sized particulate product was divided into two portions, one of which was tempered to absorb moisture until it held about 20% by weight of water, the other to hold about 40% of water.

The following tests were carried out using this material in a series of evaluation tests to determine its suitability as a filter medium for cigarettes.

The tobacco filling in four cigarettes of a commercial brand manufactured with a composite cellulose filter portion in one end of the cigarette was carefully withdrawn and stored in a manner to ensure that no moisture was lost from the shredded material. The filter ends were handled gently so that the filtering material remained essentially intact.

A half-inch long plug of the prepared moss containing 20% moisture was then packed into the first paper sleeve in firm contact with the filter tip, and the remainder of the sleeve was filled with a packing of the removed tobacco. The reconstructed cigarette was smoked down to the moss plug and was then butted out and set aside, being marked No. 1.

Approximately a half inch of granular charcoal was packed into the second cigarette sleeve in contact with the filter tip. After the tobacco packing had been restored to the sleeve, the cigarette was smoked down to the charcoal and was then butted out and set aside, being marked No. 2.

A filter taken from a fifth cigarette of the same brand was placed inside the third cigarette sleeve in contact with the existing filter tip, thereby making a double-length filter over an inch long. After the tobacco packing had been restored, the cigarette was smoked down to the filter and was then butted out and set aside, being marked No. 3.

A plug measuring approximately a half-inch in length was formed by packing the 40% moisture prepared moss into the fourth cigarette sleeve in contact with the existing filter tip. After the tobacco had been repacked to fill the sleeve the resulting cigarette was smoked down to the moss and was then butted out and set aside, being marked No. 4.

Each butt was sliced through along its axis and examined for staining of the original cellulose packing. The No. 1 butt showed about 35% of its length stained, the No. 2 butt was stained for about 75% of the length of the filter, the No. 3 butt being stained nearly 90% of the filter length, while the filter in No. 4 but showed only about 20% stained portion.

The fact that the No. 1 and No. 4 butts each included moss filter plugs, coupled with the fact that the least staining showed in the existing filter tip behind these plugs, leads to the conclusion that a moss filter medium prepared according to the process described hereinabove provides far superior protection to smokers against stain-producing components of cigarette smoke than do known filter media. The staining ingredients have been identified by others as comprising carbolic acid and other acids, acetaldehyde, and acrolein, which substances have been shown to be responsible for paralyzing cilia of the human respiratory tree. It is significant also that the least staining was found in the tip which had a moss plug ahead of it in the smoke stream that held a relatively high content of moisture. It was concluded that the optimum moisture content for a moss filter lies in the range from about 30% to over 40%.

It is seen from the No. 2 butt that the charcoal granule filter is partly effective; I therefore propose that the moss filter medium may be used in any combination with such charcoal filtering medium, as for example, with the granular material mixed with the moss, or with separate plugs of the materials placed in any order. The moss filter could also be used in place of charcoal located between the regular cellulose or cork end and the tobacco.

The principal advantages of the decoloring treatment described above are its economy and effectiveness, and the modest plant requirements for large-scale treatment. Whether the batch process or a continuous flow process is employed, an initial exposure of the peat moss to higher concentrations of the alkali bleach solution, followed by progressively lower concentrations, favours retention of most of the original structural strength and coherence of the plant material, while minimizing the loss of active oxygen.

The process may be modified considerably from the exemplary treatments herein described, within the scope of the following claims.

I claim:
1. The method of preparing a filter medium which comprises the steps of selecting plant residues of mosses of the genus Sphagnum or Hypnum occurring in bogs from upper layers thereof overlying peat deposits so as to exclude peaty and degraded vegetable matter, the selected residues being characterized by finely-branched fibrous form having substantially undegraded cellular network structure, precleaning the selected moss residues to remove foreign matter and colloidal contaminants, soaking the precleaned material in an aqueous dilute solution of sodium hypochlorite at a pH lying in the range pH 9 to about pH 12 at an elevated temperature until the moss residues are substantially free of waxes and coloring matter, rinsing the bleached moss residues to yield a neutral product, and drying the product to a retained moisture content in the range 10% to 45% by weight.

2. The method of claim 1 wherein said soaking step is carried out in a solution at a concentration of from 0.05% to about 10% by weight of sodium hypochlorite and said elevated temperature is in the range from 120° F. to the boiling point of said solution.

3. The method of claim 2 wherein said soaking step is carried out in successive baths of progressively decreasing concentration wherein the final bath is at a concentration of about 0.05%.

4. The method of removing a stable emulsion of the water-in-oil type from a hydrocarbon fluid, comprising the step of passing said fluid through a filter packed with particulate moss product which has been prepared by the method of claim 1.

5. The method of claim 4 wherein said fluid is a middle distillate.

6. The method of claim 4 wherein said fluid is a lubricating oil.

References Cited

UNITED STATES PATENTS

| | | | |
|---|---|---|---|
| 1,547,712 | 7/1925 | Zoul | 208—188 |
| 2,962,411 | 11/1960 | Zsacsko | 131—261 |
| 3,140,961 | 7/1964 | Kronlund | 134—25 |

FOREIGN PATENTS 500,894  2/1939  Great Britain.

OTHER REFERENCES

Chemical Abstracts, 28, pp. 4510$^9$ and 4511 (1934).
Chemical Abstracts, 33, p. 1552$^8$ (1939).
Chemical Abstracts, 33, p. 7529$^9$ (1939).

MAURICE W. GREENSTEIN, *Primary Examiner.*

U.S. Cl. X.R.

99—48, 105; 131—261; 208—187; 210—23, 500, 502